No. 609,444. Patented Aug. 23, 1898.
J. F. LEWIS.
LUBRICATOR.
(Application filed Jan. 7, 1898.)
(No Model.)
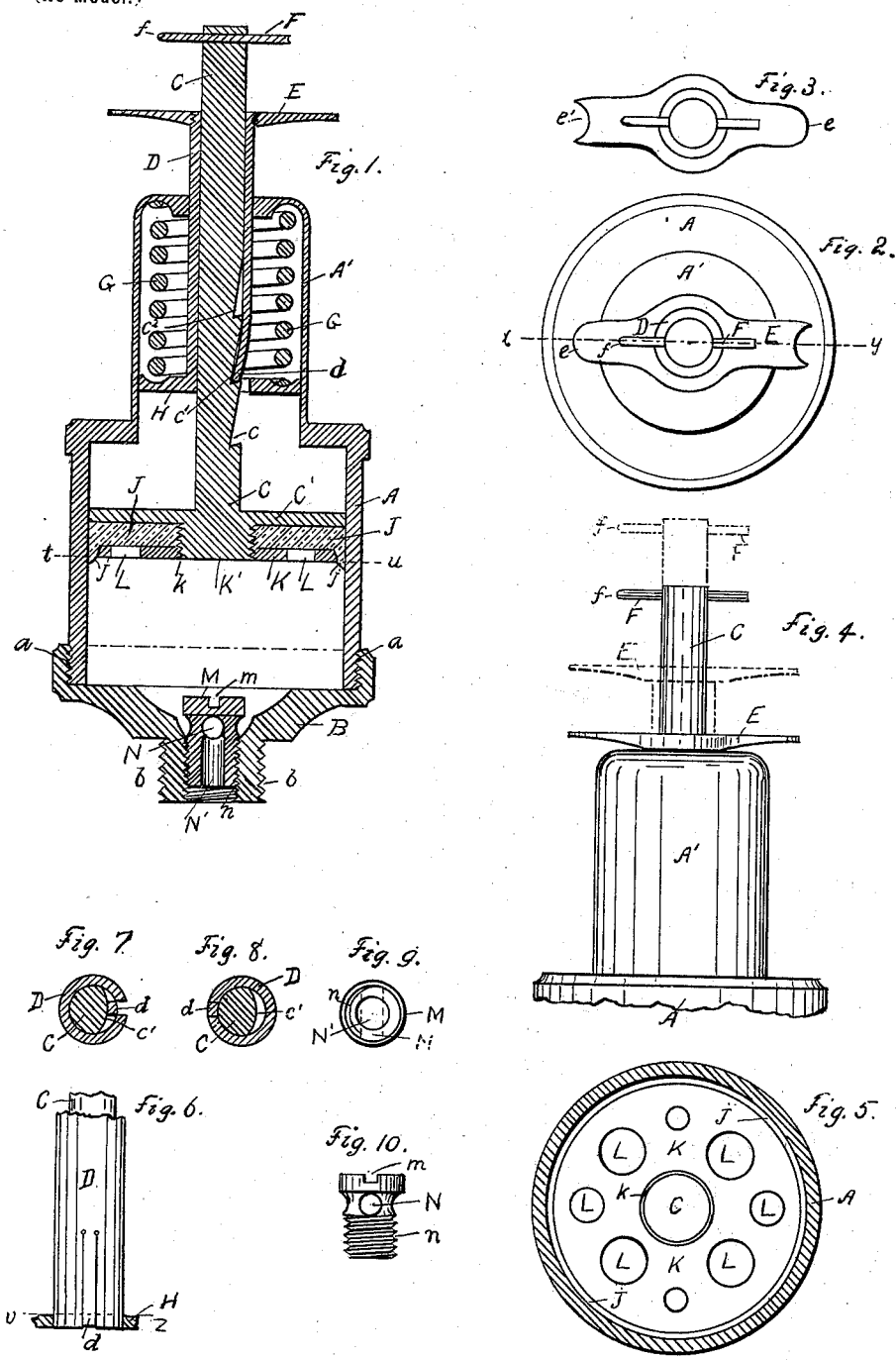
WITNESSES:
N. R. Gough.
A. J. Branda.
INVENTOR,
John F. Lewis
per D B Replogle
Atty.

UNITED STATES PATENT OFFICE.

JOHN F. LEWIS, OF SCRANTON, PENNSYLVANIA, ASSIGNOR TO THE LACKAWANNA LUBRICATING COMPANY, OF PENNSYLVANIA.

LUBRICATOR.

SPECIFICATION forming part of Letters Patent No. 609,444, dated August 23, 1898.

Application filed January 7, 1898. Serial No. 665,937. (No model.)

*To all whom it may concern:*

Be it known that I, JOHN F. LEWIS, a citizen of the United States, residing at Scranton, in the county of Lackawanna and State of Pennsylvania, have invented certain new and useful Improvements in Grease-Cups; and I declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to that class of lubricators or grease-cups which are designed to feed semiliquids to the working parts of machinery by means of the pressure of a coiled spring secured in the upper part of the cup and is intended as a material improvement on the invention secured by me in Letters Patent No. 407,226, dated July 16, 1889.

The objects of the present invention are to render the device more simple of construction and more easily adjusted and to furnish an indicator whereby the attendant may ascertain whether or not the cup is acting and to what extent the contents of it are exhausted, also to more fully regulate the flow of lubricant, and other objects, as herein set forth and embodied in the claims.

To this end the improvement consists in the novel construction, combination, and arrangement of parts, as herein set forth, and illustrated in the accompanying drawings, in which—

Figure 1 is a view in vertical cross-section of all the parts of the device, the cross-section being taken on the line $x\,y$ of Fig. 2. Fig. 2 is a top view of the device. Fig. 3 is a top view of the handles of the device when the spring is released from action on the plunger thereof. Fig. 4 is a side elevation of the top of one of my lubricators, showing how the handles thereof become an indicator. Fig. 5 is an under side view of the plunger of the device and the walls of the main chamber, taken in cross-section on the line $t\,u$ of Fig. 1. Fig. 6 is a fragmentary elevation of part of the sleeve and plunger-rod. Fig. 7 is a view in cross-section taken on the line $v\,z$ of Fig. 6 when the handles are turned as shown in Fig. 2. Fig. 8 is a cross-section taken on the same line of Fig. 6 when the handles are turned as shown in Fig. 3. Fig. 9 is an under side view of the plug used to regulate the flow of lubricants through the device. Fig. 10 is a side elevation of the said plug.

Similar letters of reference refer to similar parts throughout the several views.

A designates the barrel or reservoir of the device, cylindrical in form and surmounted by the smaller cylindrical dome A', having a circular opening in the center of its top portion, through which slides the tube or sleeve D, provided at its lower end with the seat H for the helical spring G. The disk or C portion H slides loosely upward and downward of the dome H' and to the upper end of the sleeve D, to which it is attached. The handle E is fastened by means of a screw-threaded connection, and the said handle is turned so that the round end $e$ is directly over the tongue $d$ of the sleeve D. Extending upward through the sleeve D is the plunger-rod C, provided with the cross-piece or handle F and also with the catches $c\,c'\,c''$ or any desired number of such catches, which are made by filing away sloping portions of the rod C. The plunger-rod C has integrally made with it the flange C', exactly fitting the cylinder A and designed to slide upward and downward through it. It is also provided with a threaded shank K', onto which the disk K, cored at L L, &c., may be screwed by means of the thread $k$. Interposed between C' and K is any suitable packing material, as soft leather or rubber J, which when compressed makes an annular flange $j$, tightly fitting against the inner sides of the barrel A.

B designates a base-piece having an internal screw-thread $a$, by means of which it is screwed to the lower portion of the barrel A, and is also provided with a screw-threaded shank $b$, having an internal screw-thread $n$, into which the plug M is screwed downward before the base is attached to the barrel portion. The plug M is hacked at $m$, so that it may be turned with a screw-driver, and is furnished with a transverse bore N and a longitudinal bore N', intersecting with N.

The operation of the device is as follows: The plug M is inserted into the shank $b$ to the depth required. The deeper it is driven the less flow it will permit. The base-piece is then screwed into the journal intended to be lubricated. The barrel portion is then filled with lubricant by turning the sleeve D, by means of the handle E, into the position illustrated in Fig. 8, when the flange will readily slide to the upper part of its course. The cup then being held in an inverted position may be filled with lubricant. After being filled it is screwed onto the base-piece B, and the sleeve D is turned around into the position indicated in Figs. 2 and 7. It is then drawn upward by the handle E, compressing the spring G until the tongue $d$ snaps into the first catch $c$, the spring G being made sufficiently long so that when not under compression it would extend about one-quarter way down through the upward portion of the lubricator. The action of the spring will then drive the flange gradually downward, forcing out lubricant into the journal, until it is pressed downward a distance equal to or greater than that between two consecutive catches. When the spring has pressed the plunger down until the handle E rests on top of the dome A', as shown in Fig. 4, the device will not operate any longer until the sleeve D is pulled upward again, compressing the spring and allowing the tongue $d$ to catch in next consecutive catch $c'$, and the operation is the same throughout the series of catches, the handles always indicating whether the tongue $d$ is in engagement or not by the ends of the handles F and E coinciding—that is, when the round end $f$ is in conjunction with the round end $e$ the tongue $d$ is in engagement with the plunger-rod; but when the round end of F is in opposition to $d$ or in conjunction with $e'$, as shown in Fig. 3, then the tongue $d$ is out of engagement, as further shown in Fig. 8, so that the plunger-rod may be slid upward or downward without resistance on the part of the tongue $d$.

Having thus described my invention, what I claim as new, and desire to secure by Letters Patent, is—

1. In a lubricator of the kind described the combination of a barrel or main portion with the plunger operating therein the said plunger being provided with a cylindrical stem having portions filed away at regular intervals so as to form catches which are adapted to engage with an inwardly-bent tongue of a spring-actuated sleeve incasing said plunger-rod the said catches being sloped so as to permit of an upward or sidewise sliding of said tongue to throw it out of engagement, substantially as specified.

2. The herein-described lubricator consisting of the barrel portion A having the dome A' integrally made therewith and adapted to have compressed within it the coiled spring G, the coiled spring G inclosed therein and encircling the movable sleeve D, the sleeve D having the seat H by means of which the spring may be compressed when the sleeve is slid upward; together with a plunger fitted in the barrel portion A, and the stem thereof extending upward through the said sleeve D the said stem having catches adapted to engage with an inward-bent portion of the said sleeve D so that the action of the spring may thereby be exerted on the plunger substantially as and for the purpose specified.

3. In a lubricator of the kind described the combination of a cylindrical plunger-rod, having catches cut out on one side thereof, extending through a sleeve having a tongue bent in from one of its sides adapted to engage with the catches on the said plunger-rod and the said sleeve being revoluble on the plunger-rod so as to throw the said inward-bent tongue out of or into engagement with the catches substantially as specified.

4. In combination with a lubricator of the kind described the main or barrel portion adapted to hold the lubricant a plunger having an upwardly-extending rod fitted therein and a sleeve through which the rod of said plunger is adapted to slide; the said plunger-rod having catches cut in one side thereof and the said sleeve having a tongue adapted to spring inwardly from one of the sides thereof and engage with the catches on the said plunger-rod; together with handles attached to the upper ends of the said plunger-rod and sleeve by means of which they may be revolved relatively the said handles marked so as to indicate by their relative position whether the tongue aforesaid is into or out of engagement with the catches on the plunger-rod, substantially as specified.

In testimony whereof I affix my signature in presence of two witnesses.

JOHN F. LEWIS.

Witnesses:
F. A. BRANDO,
G. F. ORR.